US010502091B2

(12) United States Patent
McGuire, II et al.

(10) Patent No.: US 10,502,091 B2
(45) Date of Patent: Dec. 10, 2019

(54) SYNC RING ASSEMBLY AND ASSOCIATED CLEVIS INCLUDING A RIB

(71) Applicant: United Technologies Corporation, Farmington, CT (US)

(72) Inventors: James F. McGuire, II, East Hampton, CT (US); Venkata Reddy Chimalamarri, Hyderabad (IN); Seetharama Reddy Katta Jayakumar, Bangalore (IN)

(73) Assignee: United Technologies Corporation, Farmington, CT (US)

( * ) Notice: Subject to any disclaimer, the term of this patent is extended or adjusted under 35 U.S.C. 154(b) by 374 days.

(21) Appl. No.: 15/375,810

(22) Filed: Dec. 12, 2016

(65) Prior Publication Data

US 2018/0163565 A1   Jun. 14, 2018

(51) Int. Cl.
| *F01D 17/16* | (2006.01) |
| *F01D 25/04* | (2006.01) |
| *F01D 25/24* | (2006.01) |
| *F04D 29/52* | (2006.01) |
| *F04D 29/56* | (2006.01) |

(52) U.S. Cl.
CPC .............. *F01D 25/04* (2013.01); *F01D 17/16* (2013.01); *F01D 17/162* (2013.01); *F01D 25/243* (2013.01); *F04D 29/522* (2013.01); *F04D 29/563* (2013.01); *F05D 2220/32* (2013.01); *F05D 2260/50* (2013.01); *F05D 2260/79* (2013.01); *F05D 2260/96* (2013.01); *F05D 2300/133* (2013.01); *Y02T 50/671* (2013.01)

(58) Field of Classification Search
CPC .............................. F01D 17/162; F01D 17/165
See application file for complete search history.

(56) References Cited

U.S. PATENT DOCUMENTS

| 4,242,021 A | 12/1980 | Sloane |
| 4,409,788 A | 10/1983 | Nash |
| 4,812,106 A | 3/1989 | Purgavie |
| 4,817,871 A | 4/1989 | Berneuil |
| 4,892,254 A | 1/1990 | Schneider |
| 5,239,815 A | 8/1993 | Barcza |
| 5,292,227 A | 3/1994 | Czachor |
| 5,429,877 A | 7/1995 | Eylon |
| 5,466,122 A | 11/1995 | Charbonnel |
| 5,549,448 A * | 8/1996 | Langston ............. F01D 17/162 29/889.2 |
| 5,620,154 A * | 4/1997 | Hey ...................... B64D 27/18 244/54 |
| 5,794,850 A | 8/1998 | Gutierrez, Jr. |
| 5,797,544 A | 8/1998 | Ward |

(Continued)

OTHER PUBLICATIONS

EP search report for EP17205661.6 dated May 2, 2018.

(Continued)

*Primary Examiner* — Carlos A Rivera
*Assistant Examiner* — Behnoush Haghighian
(74) *Attorney, Agent, or Firm* — O'Shea Getz P.C.

(57) ABSTRACT

Aspects of the disclosure are directed to a sync ring assembly associated with an engine, comprising: a sync ring, and a clevis coupled to the sync ring, where the clevis includes a rib that resists a deflection of the sync ring assembly when the engine is operated, and where the clevis is made of titanium.

15 Claims, 10 Drawing Sheets

(56) References Cited

U.S. PATENT DOCUMENTS

| | | | |
|---|---|---|---|
| 5,848,770 A | 12/1998 | Oliver | |
| 6,224,025 B1 | 5/2001 | Alvarez | |
| 7,870,741 B2 | 1/2011 | Corsmeier | |
| 7,938,620 B2* | 5/2011 | Bouru | F01D 17/162 415/160 |
| 8,328,512 B2* | 12/2012 | Major | F01D 17/162 415/209.4 |
| 8,672,260 B2* | 3/2014 | Penda | B64D 27/20 244/54 |
| 8,794,910 B2 | 8/2014 | Gasmen | |
| 8,800,917 B2 | 8/2014 | Machado | |
| 9,353,644 B2* | 5/2016 | LeBlanc | F01D 17/162 |
| 9,422,825 B2* | 8/2016 | Do | F02C 9/20 |
| 9,988,926 B2* | 6/2018 | Gasmen | F01D 17/162 |
| 10,161,407 B2* | 12/2018 | St. Mary | F01D 17/20 |
| 2005/0129510 A1 | 6/2005 | Raine et al. | |
| 2005/0131312 A1 | 6/2005 | Endara | |
| 2005/0169741 A1* | 8/2005 | Kies | F01D 17/162 415/1 |
| 2006/0133890 A1* | 6/2006 | Etoile | F16C 11/0614 403/122 |
| 2007/0237631 A1* | 10/2007 | Lytle | F01D 17/162 415/191 |
| 2010/0189549 A1 | 7/2010 | Gilman et al. | |
| 2013/0306755 A1 | 11/2013 | Dittmann | |
| 2014/0314540 A1 | 10/2014 | Do | |
| 2016/0040550 A1 | 2/2016 | Do | |
| 2016/0102574 A1 | 4/2016 | Peters | |
| 2016/0123339 A1* | 5/2016 | St. Mary | F01D 17/20 60/226.1 |

OTHER PUBLICATIONS

Viktoria Steininger, "Capabilities That Aircraft Engine Mounts Must Possess", available from <http://www.voestalpine.com/blog/en/mobility/capabilities-that-aircraft-engine-mounts-must-possess/>, Oct. 15, 2015.

* cited by examiner

FIG. 6A

SYNC RING ASSEMBLY AND ASSOCIATED CLEVIS INCLUDING A RIB

BACKGROUND

Gas turbine engines, such as those which power aircraft and industrial equipment, employ a compressor to compress air that is drawn into the engine and a turbine to capture energy associated with the combustion of a fuel-air mixture.

Figure 2A:
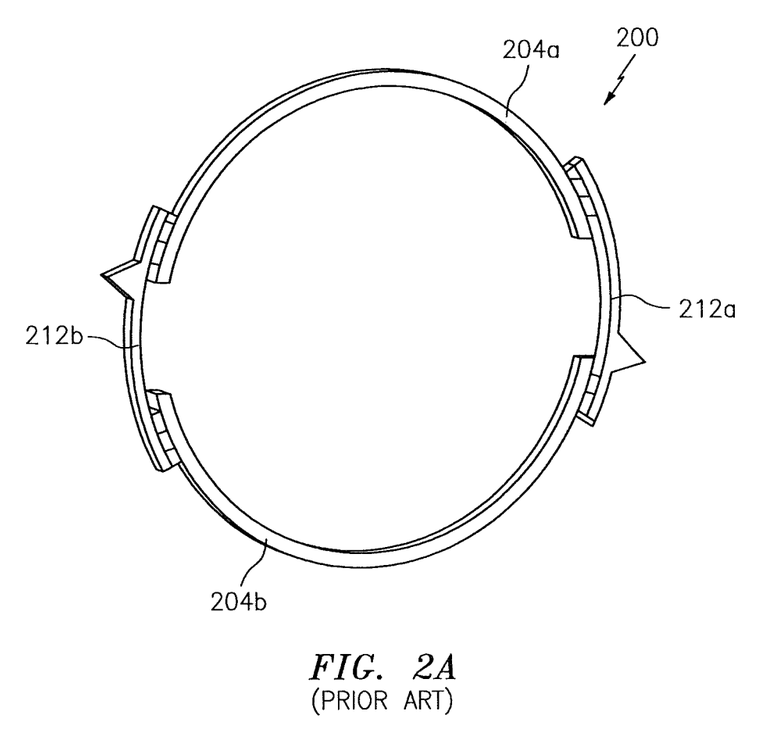
FIG. 2A illustrates a prior art sync ring assembly.

Referring to FIG. 2A, a prior art sync ring assembly 200 is shown. The assembly 200 is formed from sync rings 204a and 204b. The sync rings 204a and 204b are coupled to one another via clevises 212a and 212b. Conventionally, the sync rings 204a and 204b are made of steel and the clevises 212a and 212b are made of nickel.

Figure 2B:
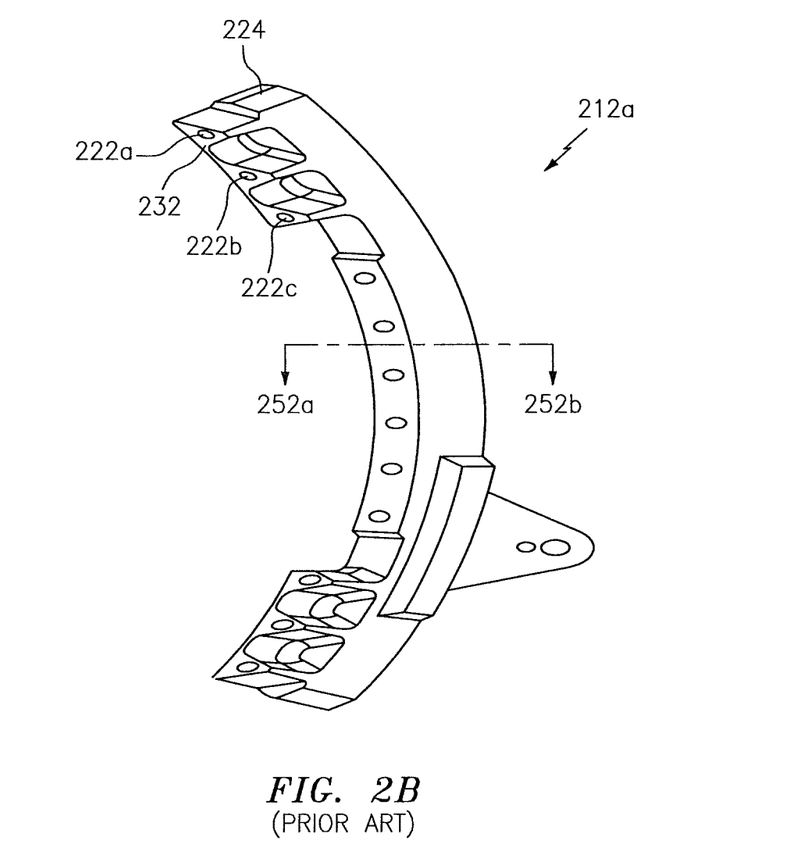
FIG. 2B illustrates a clevis of the sync ring assembly of FIG. 2A.
Figure 2C:
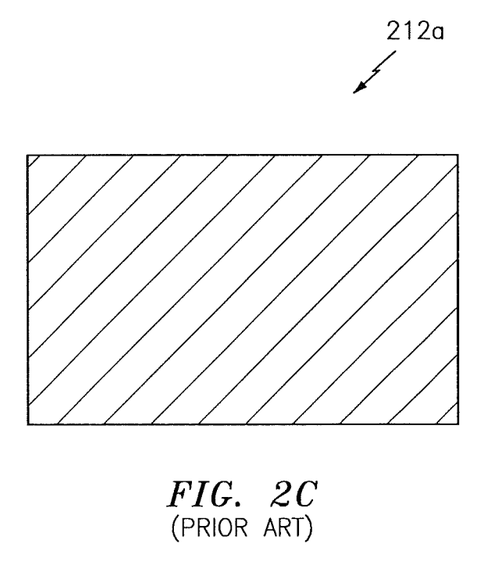
FIG. 2C illustrates a cross-section of the clevis of FIG. 2B.

FIG. 2B illustrates a clevis (e.g., clevis 212a) of the assembly 200 of FIG. 2A. As shown, the clevis includes stand-offs 222a, 222b, and 222c at/proximate a first end 224 of the clevis. The stand-offs include holes to seat fasteners (not shown) for coupling the clevis to a sync ring (e.g., sync ring 204a—see FIG. 2A). The clevis also includes a wall 232 in proximity to the stand-offs 222a-222c. FIG. 2C illustrates a cross-section of the clevis of FIG. 2B taken about the line 252a-252b. The reasons for the inclusion of FIG. 2C will become more apparent in the description to follow.

During engine operation, the assembly 200 may experience one or more deflections during a surge condition (where the surge condition may be in response to one or more changing environmental conditions, operator/pilot inputs, etc.). In order to maintain the structural and functionality integrity of the engine, the assembly 200 may be required to provide an associated degree of stiffness to counter/resist the tendency to deflect during the surge condition.

Accordingly, what is needed is a sync ring assembly that has greater stiffness to reduce the magnitude of the deflections experienced by the sync ring assembly during engine operation. Furthermore, a reduction in weight of the sync ring assembly would promote engine efficiency/performance in terms of, e.g., thrust specific fuel consumption.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to a sync ring assembly associated with an engine, comprising: a sync ring, and a clevis coupled to the sync ring, where the clevis includes a rib that resists a deflection of the sync ring assembly when the engine is operated, and where the clevis is made of titanium. In some embodiments, the rib is located on an interior of the clevis. In some embodiments, the clevis includes a second rib. In some embodiments, the second rib is located on an exterior of the clevis. In some embodiments, the rib is located on an exterior of the clevis. In some embodiments, the clevis includes at least one stand-off that includes a hole to seat a fastener that couples the clevis to the sync ring. In some embodiments, a radial projection of the rib is confined within a radial projection of the at least one stand-off. In some embodiments, the at least one stand-off is located proximate a first end of the clevis. In some embodiments, the clevis is wall-free in proximity to a first end of the clevis. In some embodiments, the clevis includes a wall proximate to a second end of the clevis, where the second end is opposed to the first end. In some embodiments, the sync ring assembly further comprises a second clevis coupled to the sync ring. In some embodiments, the sync ring assembly further comprises a second sync ring coupled to the first clevis and the second clevis. In some embodiments, the second clevis includes a second rib.

BRIEF DESCRIPTION OF THE DRAWINGS

The present disclosure is illustrated by way of example and not limited in the accompanying figures in which like reference numerals indicate similar elements. The drawing figures are not necessarily drawn to scale unless specifically indicated otherwise.

DETAILED DESCRIPTION

It is noted that various connections are set forth between elements in the following description and in the drawings (the contents of which are included in this disclosure by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities or a space/gap between the entities that are being coupled to one another.

Aspects of the disclosure are directed to apparatuses, systems, and method associated with a sync ring assembly for an engine. The sync ring assembly may include one or more sync rings and one or more clevises. A clevis may be manufactured of one or more materials, e.g., titanium. The clevis may include a rib that may provide stiffness to the clevis.

Figure 1:
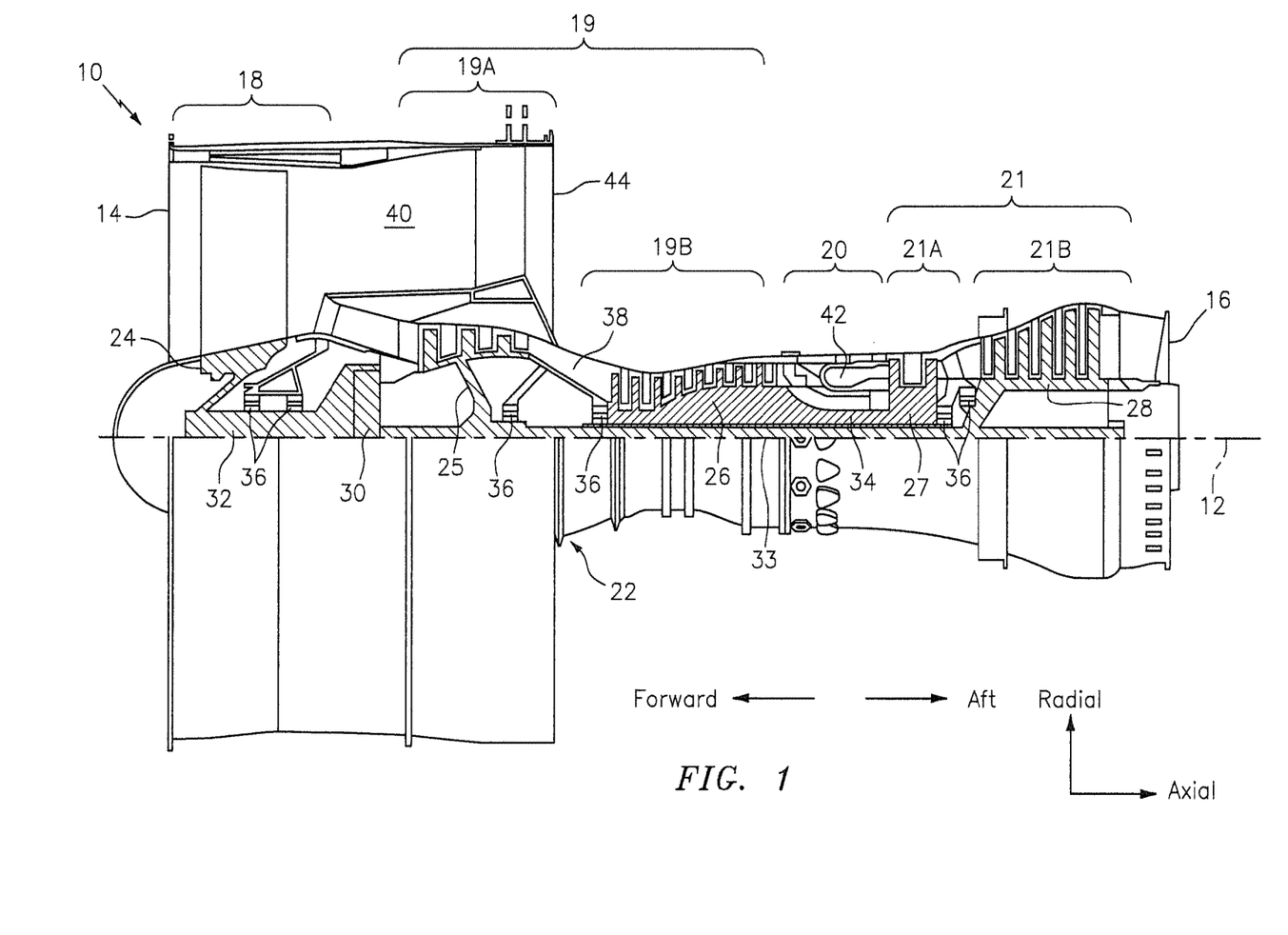
FIG. 1 is a side cutaway illustration of a geared turbine engine.

Aspects of the disclosure may be applied in connection with a gas turbine engine. FIG. 1 is a side cutaway illustration of a geared turbine engine 10. This turbine engine 10 extends along an axial centerline 12 between an upstream airflow inlet 14 and a downstream airflow exhaust 16. The turbine engine 10 includes a fan section 18, a compressor section 19, a combustor section 20 and a turbine section 21. The compressor section 19 includes a low pressure compressor (LPC) section 19A and a high pressure compressor (HPC) section 19B. The turbine section 21 includes a high pressure turbine (HPT) section 21A and a low pressure turbine (LPT) section 21B.

The engine sections 18-21 are arranged sequentially along the centerline 12 within an engine housing 22. Each of the engine sections 18-19B, 21A and 21B includes a respective rotor 24-28. Each of these rotors 24-28 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 24 is connected to a gear train 30, for example, through a fan shaft 32. The gear train 30 and the LPC rotor 25 are connected to and driven by the LPT rotor 28 through a low speed shaft 33. The HPC rotor 26 is connected to and driven by the HPT rotor 27 through a high speed shaft 34. The shafts 32-34 are rotatably supported by a plurality of bearings 36; e.g., rolling element and/or thrust bearings. Each of these bearings 36 is connected to the engine housing 22 by at least one stationary structure such as, for example, an annular support strut.

During operation, air enters the turbine engine 10 through the airflow inlet 14, and is directed through the fan section 18 and into a core gas path 38 and a bypass gas path 40. The air within the core gas path 38 may be referred to as "core air". The air within the bypass gas path 40 may be referred to as "bypass air". The core air is directed through the engine sections 19-21, and exits the turbine engine 10 through the airflow exhaust 16 to provide forward engine thrust. Within the combustor section 20, fuel is injected into a combustion chamber 42 and mixed with compressed core air. This fuel-core air mixture is ignited to power the turbine engine 10. The bypass air is directed through the bypass gas path 40 and out of the turbine engine 10 through a bypass nozzle 44 to provide additional forward engine thrust. This additional forward engine thrust may account for a majority (e.g., more than 70 percent) of total engine thrust. Alternatively, at least some of the bypass air may be directed out of the turbine engine 10 through a thrust reverser to provide reverse engine thrust.

FIG. 1 represents one possible configuration for an engine 10. Aspects of the disclosure may be applied in connection with other environments, including additional configurations for gas turbine engines.

Figure 3A:
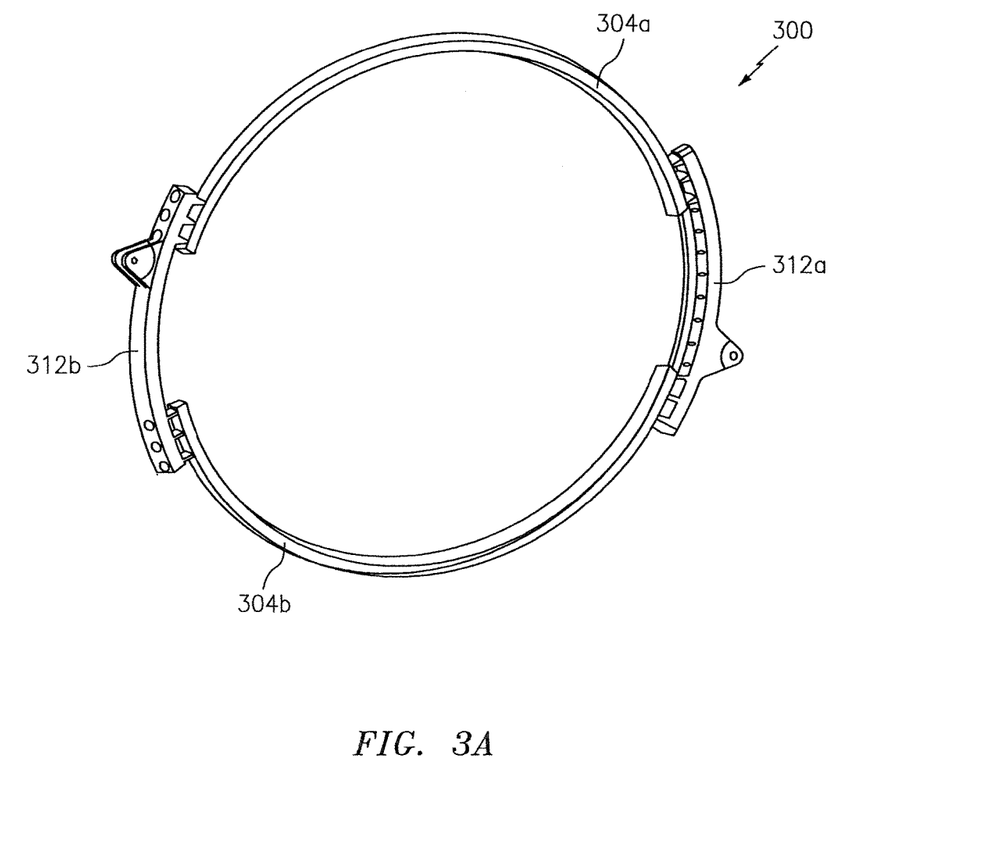
FIG. 3A illustrates a sync ring assembly in accordance with aspects of this disclosure.

Referring to FIG. 3A, a sync ring assembly 300 is shown. The assembly 300 may be formed from sync rings 304a and 304b. The sync rings 304a and 304b may correspond to the sync rings 204a and 204b, respectively (see FIG. 2A). The sync rings 304a and 304b may be coupled to one another via clevises 312a and 312b.

The clevises 312a and 312b may be manufactured of one or more materials. For example, the clevises 312a and 312b may be manufactured by "hogging-out" titanium. Other techniques may be used in the manufacture of the clevises 312a and 312b. For example, casting, forging, etc., may be used in some embodiments.

Figure 4:
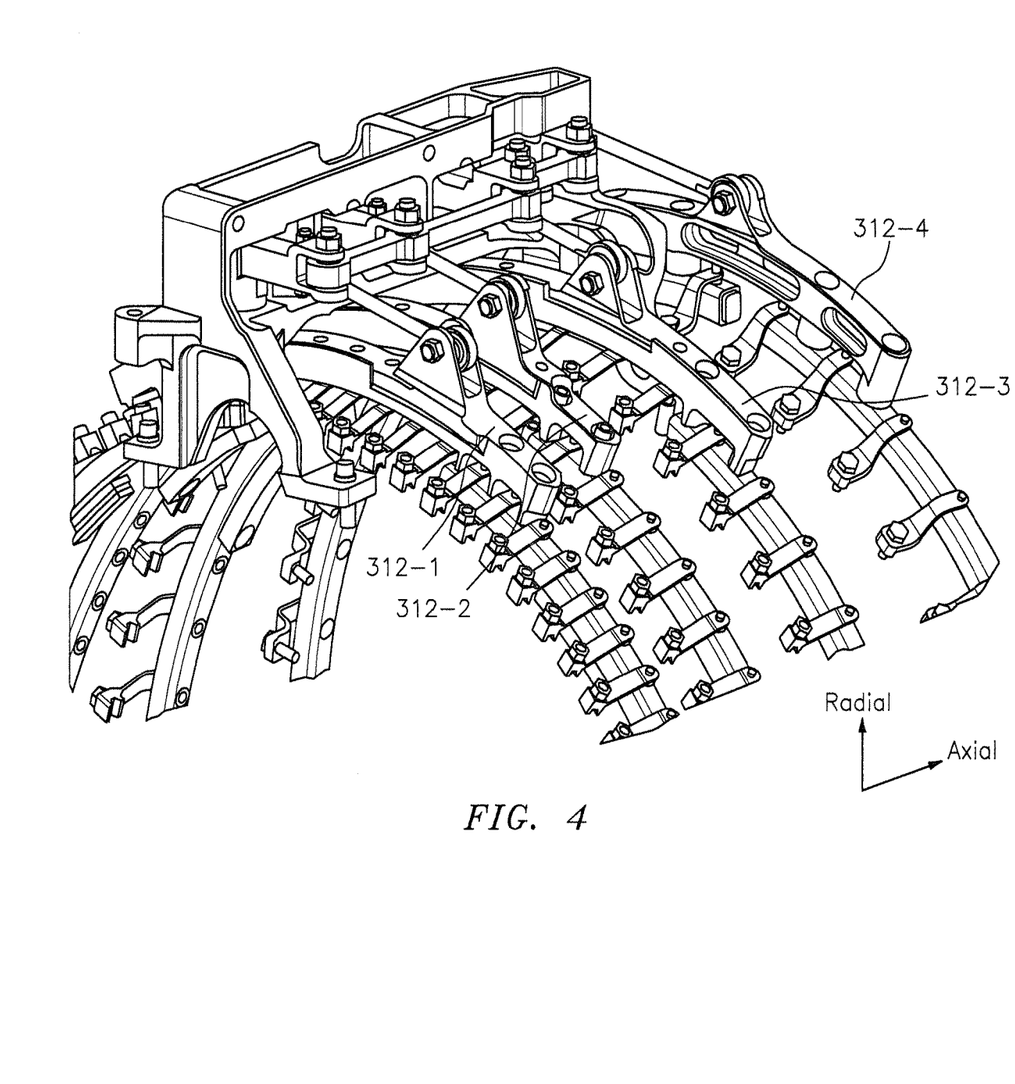
FIG. 4 illustrates an arrangement of clevises in a plurality of stages.

The assembly 300 may be incorporated as part of/over split case flanges of an engine (e.g., the engine 10 of FIG. 1). In some embodiments, the flanges may be associated with the compressor section of the engine (e.g., compressor section 19 of FIG. 1). FIG. 4 illustrates a plurality of clevises 312-1, 312-2, 312-3, and 312-4 (where the clevises 312-1 through 312-4 may correspond to the clevis 312a or the clevis 312b of FIG. 3A). The clevises 312-1 through 312-4 are shown as being arranged in one or more axial stages/station planes.

Figure 3B:
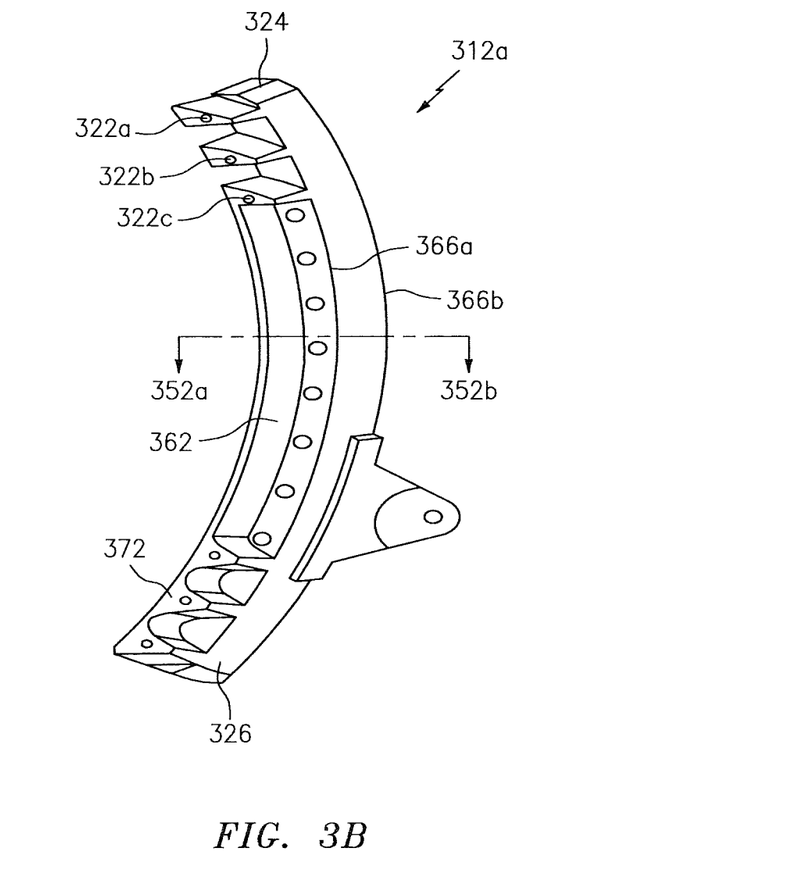
FIG. 3B illustrates a clevis of the sync ring assembly of FIG. 3A.

FIG. 3B illustrates the clevis 312a of the assembly 300 of FIG. 3A. While a description of various features of the clevis 312a is provided below, the clevis 312b may include analogous/corresponding features. In this respect, a complete re-description of such features is omitted herein for the sake of brevity.

As shown, the clevis 312a may include stand-offs 322a, 322b, and 322c at/proximate a first end 324 of the clevis. The stand-offs 322a-322c may include holes to seat fasteners (not shown) for coupling the clevis to a sync ring (e.g., sync ring 304a—see FIG. 3A). However, unlike the inclusion of the wall 232 in proximity to the stand-offs 222a-222c shown in FIG. 2B, in FIG. 3B such a wall might not be present in proximity to the stand-offs 322a-322c, which is to say that the clevis may be "wall-free" in proximity to the stand-offs 322a-322c or the first end 324. The lack of such a wall in FIG. 3B may help to reduce the weight of the clevis of FIG. 3B (relative to the clevis of FIG. 2B).

In some embodiments, the clevises 312a and 312b may be manufactured to include a rib. For example, as shown in FIG. 3B a rib 362 may be included with the clevis 312a. One skilled in the art would appreciate that the particular size/dimension, weight, and/or profile of the rib 362 may be selected to provide at least the same level/degree of stiffness/resistance to deflections for the assembly 300 (see FIG. 3A) as the assembly 200 (see FIG. 2A).

In some embodiments, a radial projection of the rib 362 may not exceed (e.g., may be confined within) a radial projection/span of the stand-offs 322a-322c. In other words, in some embodiments the clevises 312a and 312b may be backwards compatible with existing/conventional clevises (e.g., clevises 212a and 212b of FIGS. 2A-2B). Such backwards compatibility may be useful for retrofitting/substituting the clevises 312a and 312b for existing hardware/assemblies that may already be in-service/in-the-field.

While the rib 362 is shown in FIG. 3B as being located on the interior/inner diameter 366a of the clevis 312a, the rib may be located on the exterior/outer diameter 366b of the clevis 312a in some embodiments. In some embodiments, a first rib may be located on the interior/inner diameter 366a and a second rib may be located on the exterior/outer diameter 366b of the clevis 312a.

For a given rib, locating that rib on the interior/inner diameter 366a of the clevis 312a may provide greater stiffness to the assembly 300 (see FIG. 3A) than locating the rib on the exterior/outer diameter 366b. Stated slightly differently, there may be greater efficiency in terms of stiffness (per unit mass or per unit of dimension of the rib) that is obtained when the rib is located on the interior/inner diameter 366a of the clevis 312a relative to locating the rib on the exterior/outer diameter 366b of the clevis 312a. Furthermore, there might not be sufficient space available on the exterior/outer diameter 366b of the clevis 312a due to other components/parts of an engine that may be located in proximity to the clevis 312a when the assembly 300 is installed on the engine.

At/proximate a second end 326 of the clevis 312a (where the second end 326 is opposed to the first end 324) there may be a wall 372. The wall 372, in combination with the rib 362 located between the ends 324 and 326, may provide for a mistake-proof assembly of the clevis 312a with respect to the rest of the assembly 300 (see FIG. 3A). For example, the combination of the wall 372 and the rib 362 may prevent the clevis 312a from being installed in an inverted direction (e.g., the end 326 at the top and the end 324 at the bottom) relative to what is shown in FIG. 3B. In this respect, the clevis 312a may include one or more features to ensure that the clevis 312 is installed/assembled in accordance with a predetermined orientation.

Figure 3C:
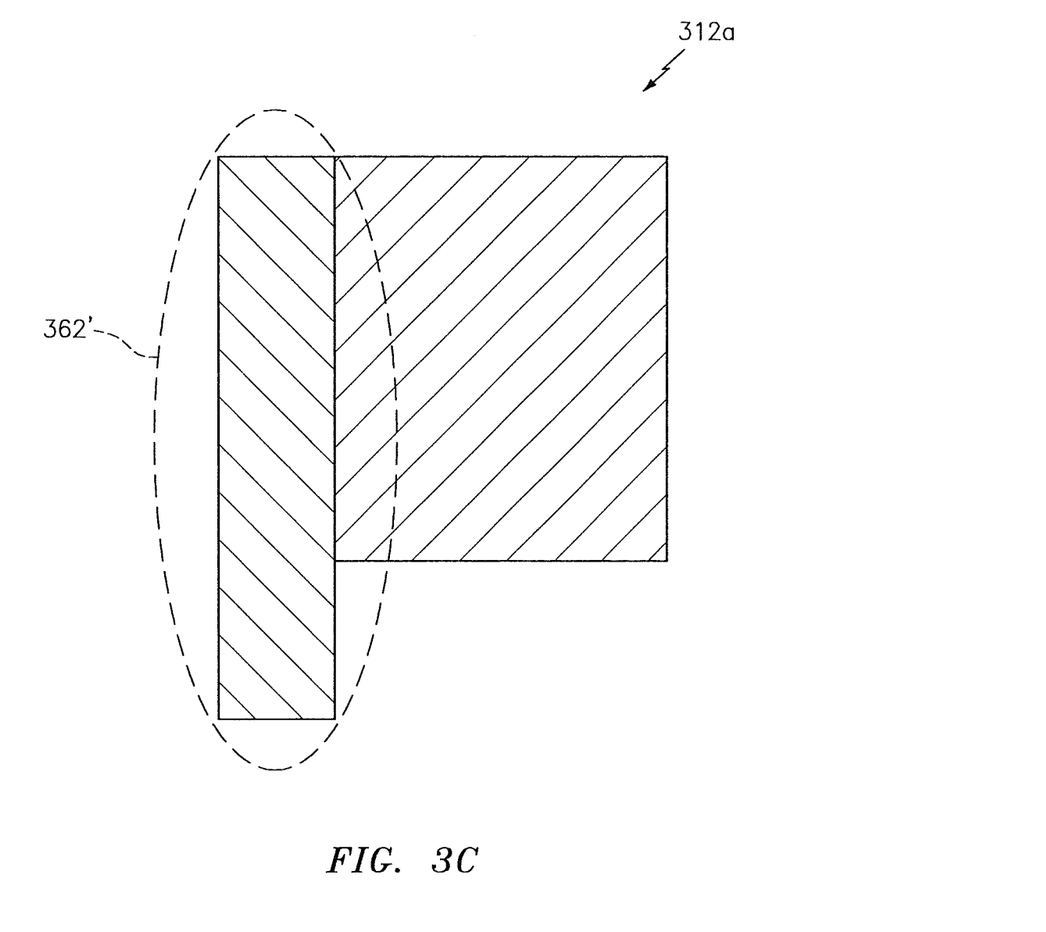
FIG. 3C illustrates a cross-section of the clevis of FIG. 3B.

FIG. 3C illustrates a cross-section of the clevis of FIG. 3B taken about the line 352a-352b. In comparing FIG. 3C to FIG. 2C, the portion denoted by/within the dashed circle 362' is attributable to the presence of the rib 362 (see FIG. 3B) that is lacking/absent in FIG. 2B.

Figure 5A:
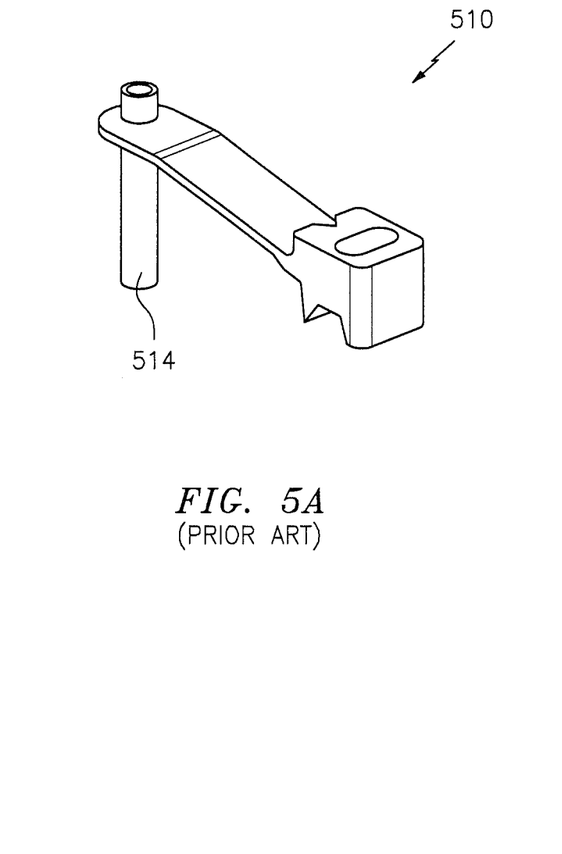
FIG. 5A illustrates a fastener in accordance with the prior art.
Figure 5B:
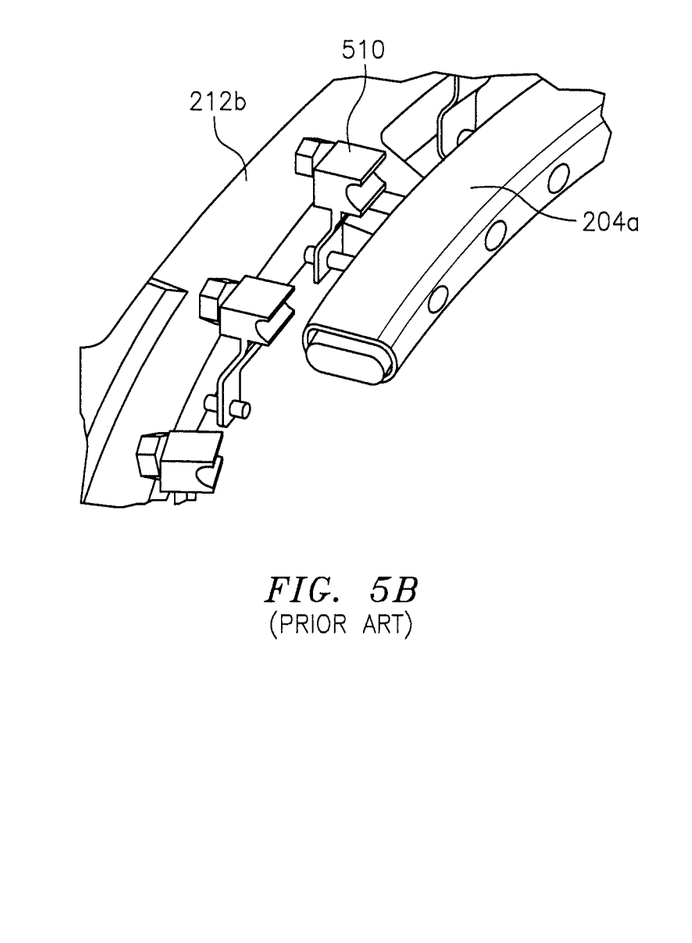
FIG. 5B illustrates a coupling of a sync ring and a clevis using the fastener of FIG. 5A.

Referring to FIGS. 5A-5B, a fastener 510 in accordance with the prior art that is used to attach a clevis to a sync ring (e.g., clevis 212b to sync ring 204a—see FIG. 2A) is shown. The fastener 510 is shown as including a pin 514, which is oriented in a downward direction in the perspective shown in FIG. 5A.

Figure 6A:
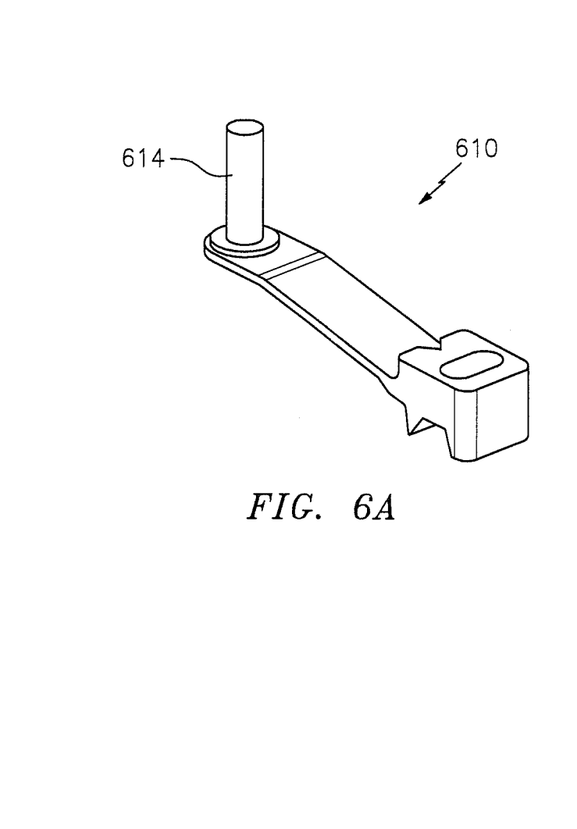
FIG. 6A illustrates a fastener in accordance with aspects of this disclosure.
Figure 6B:
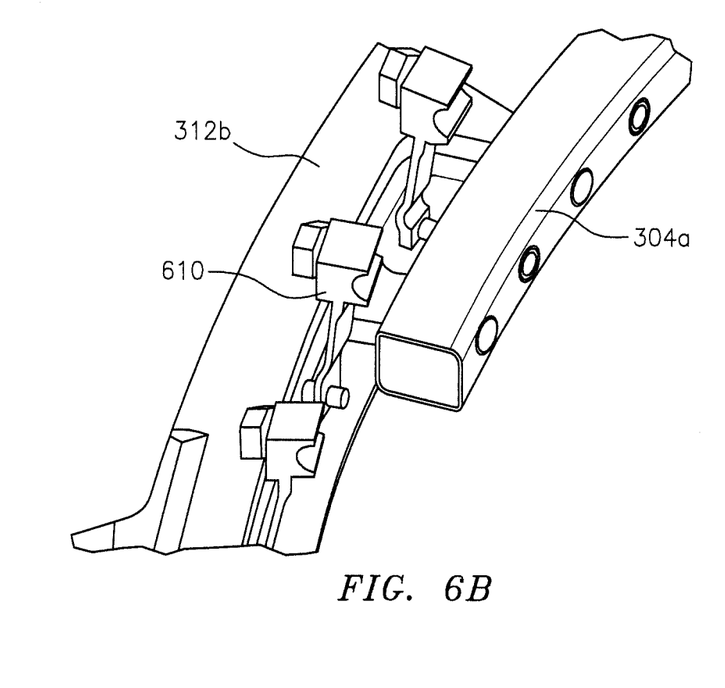
FIG. 6B illustrates a coupling of a sync ring and a clevis using the fastener of FIG. 6A.

Referring to FIGS. 6A-6B, a fastener 610 in accordance with aspects of this disclosure that is used to attach a clevis to a sync ring (e.g., clevis 312b to sync ring 304a—see FIG. 3A) is shown. The fastener 610 is shown as including a pin 614, which is oriented in an upward direction in the perspective shown in FIG. 6A (which perspective is the same as in FIG. 5A). In other words, the pin 614 projects in a direction that is opposite from the projection of the pin 514 in FIG. 5A.

Technical effects and benefits of this disclosure include a sync ring assembly that, for a given dimension of the assembly, has a lower weight than a counterpart prior art assembly of the same dimension. The reduction in weight of the assembly might not compromise the stiffness/resistance to deflection of the assembly due to the inclusion of a rib as part of one or more clevises. In some embodiments, the stiffness of the assembly may even be increased/enhanced relative to the prior art assembly.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional in accordance with aspects of the disclosure. One or more features described in connection with a first embodiment may be combined with one or more features of one or more additional embodiments.

What is claimed is:

1. A sync ring assembly for a gas turbine engine, comprising:
    a sync ring disposed about an axis, the sync ring having an outer circumferential surface; and
    a clevis having a first axial side, a second axial side opposite the first axial side, and an inner circumferential surface extending between the first axial side and the second axial side, the inner circumferential surface of the clevis coupled to outer circumferential surface of the sync ring, the clevis comprising a first plurality of projections at a first circumferential end of the clevis and a second plurality of projections at a second circumferential end of the clevis, opposite the first circumferential end, each projection of the first plurality of projections and the second plurality of projections circumferentially spaced apart from each other projection, the first plurality of projections and the second plurality of projections projecting outward from the inner circumferential surface of the clevis and defining a plurality of stand-offs,
    wherein the clevis includes a rib disposed along at least a portion of the first axial side of the clevis and extending outward from the inner circumferential surface of the clevis and wherein the rib extends circumferentially between and contacts a first projection of the first plurality of projections and a second projection of the second plurality of projections, and
    wherein the first plurality of projections couples the clevis to the sync ring.

2. The sync ring assembly of claim 1, wherein the clevis includes a second rib.

3. The sync ring assembly of claim 2, wherein the second rib is located on the outer circumferential surface of the clevis.

4. The sync ring assembly of claim 1, wherein at least one stand-off of the plurality of stand-offs includes a radially extending hole configured to seat a fastener for coupling the clevis to the sync ring.

5. The sync ring assembly of claim 1, further comprising:
    a second clevis coupled to the sync ring.

6. The sync ring assembly of claim 5, further comprising:
    a second sync ring coupled to the clevis and the second clevis.

7. The sync ring assembly of claim 5, wherein the second clevis includes a second rib.

8. The sync ring assembly of claim 1, wherein the rib is circumferentially spaced from the first circumferential end and the second circumferential end of the clevis.

9. The sync ring assembly of claim 8, wherein the clevis further comprises a wall disposed along at least a portion of the first axial side of the clevis and extending outward from the inner circumferential surface of the clevis.

10. The sync ring assembly of claim 9, wherein the wall extends along the inner circumferential surface of the clevis between the second circumferential side and the rib.

11. The sync ring assembly of claim 9, wherein the wall is connected to each projection of the second plurality of projections.

12. The sync ring assembly of claim 1, wherein the clevis is made of titanium.

13. The sync ring assembly of claim 1, wherein the rib extends along the inner circumferential surface of the clevis from the first axial side a portion of a distance between the first axial side and the second axial side of the clevis.

14. The sync ring assembly of claim 1, wherein each projection of the first plurality of projections and the second plurality of projections extends from the first axial end to the second axial end of the clevis.

15. The sync ring assembly of claim 1, wherein the first projection of the first plurality of projections, the second projection of the second plurality of projections, and the rib define a common outer surface of the clevis.

* * * * *